T. CROSSETT.
MOLD AND APPARATUS FOR MAKING U-PACKING.
APPLICATION FILED FEB. 10, 1920.
1,386,602.
Patented Aug. 9, 1921.
2 SHEETS—SHEET 2.
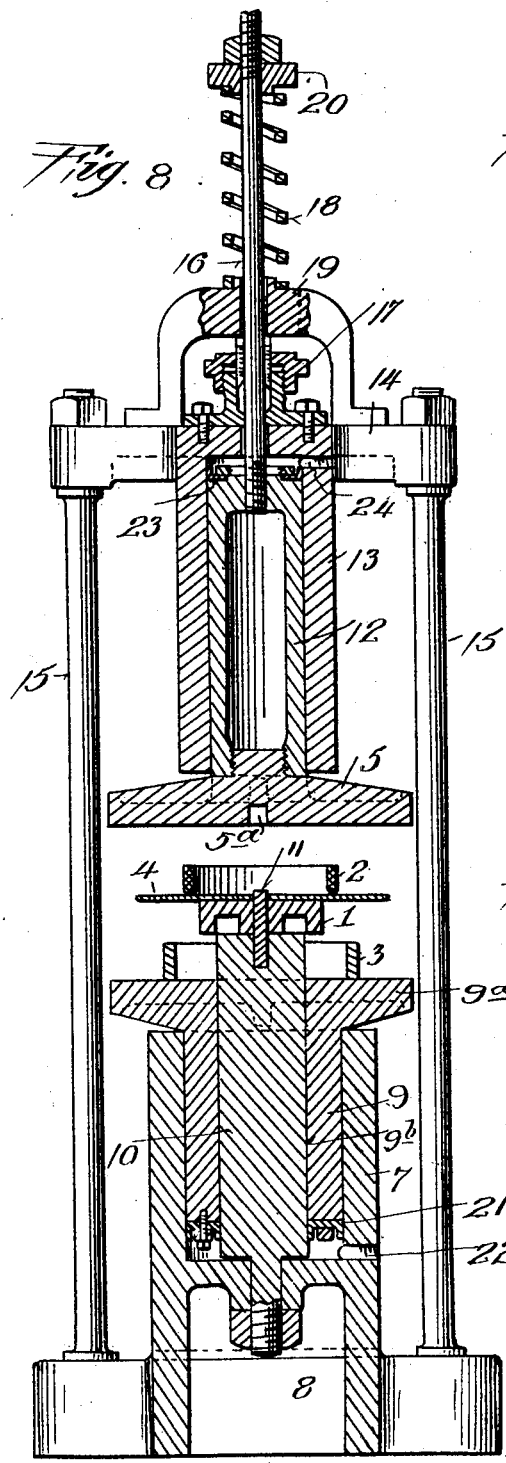
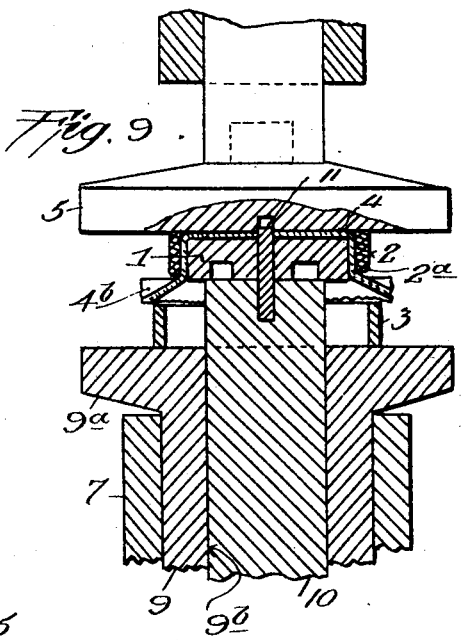
INVENTOR
Thomas Crossett
BY HIS
T. F. Bourne
ATTORNEY

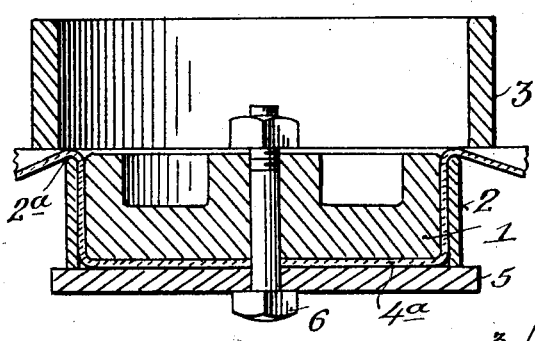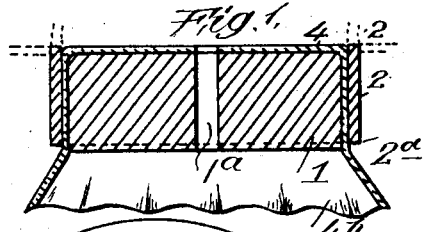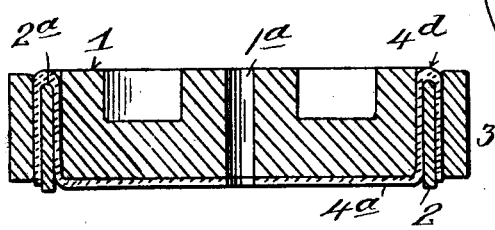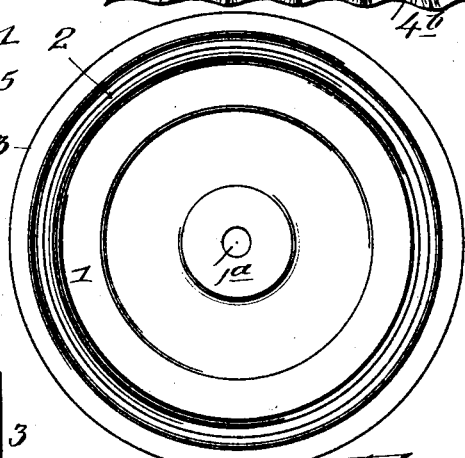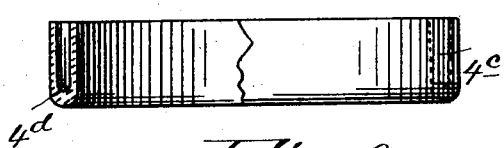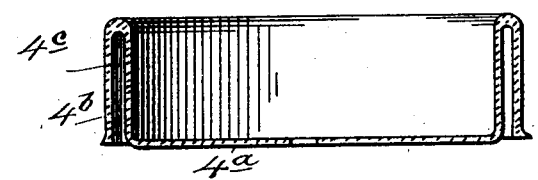

UNITED STATES PATENT OFFICE.

THOMAS CROSSETT, OF NEW YORK, N. Y.

MOLD AND APPARATUS FOR MAKING U-PACKING.

1,386,602.  Specification of Letters Patent.  Patented Aug. 9, 1921.

Original application filed May 29, 1919, Serial No. 300,652. Divided and this application filed February 10, 1920. Serial No. 357,655.

*To all whom it may concern:*

Be it known that I, THOMAS CROSSETT, a citizen of the United States, and resident of New York city, in the county of Kings and State of New York, have invented certain new and useful Improvements in Molds and Apparatus for Making U-Packing, of which the following is a specification.

This application is a division of my application for patent for method of making U-packing and mold therefor, filed May 29, 1919, Serial No. 300,652, wherein I have set forth an improved method of making U-packing and a mold for making such packing.

Heretofore, so far as I am aware, U-packings have been made by means of a two-part die, one part of which has an annular groove and the other part has an annular projection to force a corresponding portion of a disk of leather into said groove, leaving an intermediate portion of the disk to be cut out. Such forcing of the leather necessarily stretches the parts thereof that enter the groove to such an extent as to injure the leather with consequent weakening of it, whereby the U-packing so formed will crack in places and wear out quickly and will permit leakage at the joint the packing is intended to make tight. Another disadvantage is that the aforesaid stretching of the leather has the effect to make the packing thinner at the bottom of its U-groove than at the sides, rendering the packing weakest at the bottom of the U-groove where it should be the strongest.

The object of my invention is to provide improved means to produce U-packing without stretching the material thereof into a groove in a die and without injuring the material.

My present invention embodies the aforesaid mold comprising an inner member and two separate concentric rings of different diameter which fit within one another and around the inner member whereby the packing material may be folded between said member and the inner ring and between the two rings to form said material in U-shape for the packing. My invention also embodies means to support and operate the mold members for folding the material to produce the U-packing.

Reference is had to the accompanying drawings forming part hereof wherein—

Figure 1 is a central sectional view illustrating the mold members assembled in the first step in folding the material for the packing;

Fig. 2 is a similar section illustrating the mold members in position ready for final folding of the material;

Fig. 3 illustrates the parts of the mold or die assembled and the material therein folded in U shape;

Fig. 4 is an edge view of the folded material;

Fig. 5 is a cross section of Fig. 4;

Fig. 6 is a partly sectional view illustrating my improved mold packing;

Fig. 7 is a plan view of the three concentric parts of the mold;

Fig. 8 is a vertical section of my improved apparatus with the mold members and material shown in position before the first step in folding the material;

Fig. 9 is a detail section of part of Fig. 8 showing the first step of folding the material corresponding substantially to the relation of parts in Fig. 1; and Fig. 10 is a similar view showing the position of the parts after the mold members have all been assembled and the material folded therein substantially as in Fig. 3.

Similar numerals of reference indicate corresponding parts in the several views.

The numeral 1 indicates the inner member of the mold or die, shown in circular block-like form, 2 indicates a ring of greater diameter than member 1, to fit around the same and 3 indicates an outer ring of greater diameter than ring 2 to fit around the latter. A disk 4 of leather or other suitable material for the U-packing is placed centrally upon member 1, with the marginal portion of the disk protruding beyond said member, as indicated by the dotted lines in Fig. 1. Said disk will be of suitable diameter to produce the desired packing. Mold 1 will be placed upon a suitable support and ring 2 will be placed against the disk outside of member 1 and forced along the outside of said member to fold the material thereover, as illustrated in Figs. 1 and 9. The operation described produces a substantially cup-shaped part of the material having an annular wall extending substantially at right angles to the mid-portion $4^a$ and with a skirt-like portion $4^b$ of the material protruding beyond ring 2. An abutment is located against the mid-portion 4ᵃ of disk 4 which abutment in Fig. 2 is shown in the form of a plate 5 secured against said mid-portion of disk 4 and may be tightly clamped by a projection, such as a bolt or screw 6 to pass through holes in said plate and disk and through registering hole 1ᵃ in member or block 1, whereby the material at 4ᵃ is securely retained and the ring 2 is retained in place, said abutment or plate serving for the next step of the operation. In the form shown in Fig. 2 said parts are reversed in position from that indicated in Fig. 1 although said reversal is not necessary and the parts may be retained in the position in Fig. 1 as illustrated in Figs. 8, 9 and 10. When the mold members are manipulated or operated more or less by hand the skirt portion 4ᵇ of the material may be pressed outwardly and backward in the direction of ring 2 to receive the ring 3, as shown in Fig. 3, although when the mold members are operated in an apparatus such as shown in Figs. 8, 9 and 10 the pressing back of the skirt portion 4ᵇ by hand is not necessary. Ring 3 is next forced against the skirt portion 4ᵇ around ring 2 to fold the portion 4ᵇ reversely along and around the exterior of said ring, the material being folded against the edge 2ᵃ of ring 2 substantially as shown in Figs. 3 and 10, whereby the material is folded in so-called U-shape in annular form with the walls spaced concentrically outside of the central portion 4ᵃ.

In Figs. 8, 9 and 10 I have illustrated a press or apparatus particularly adapted with my improved mold members for forming U-packing in an expeditious manner. In said figures a cylinder 7 is secured to or formed with a suitable base 8, the open end of the cylinder slidably receiving a plunger or piston 9 shown having a head or table-like portion 9ᵃ upon which ring 3 is rested. Concentrically within said cylinder is secured a stem or rest 10 that extends beyond the open end of the cylinder and slidably receives the bore 9ᵇ of plunger or piston 9, whereby the latter may travel within the cylinder and along said stem. Mold member 1 is adapted to rest upon stem 10 concentrically with ring 3, said stem serving as an abutment for member 1. A pin or projection 11 secured concentrically to and projecting from stem 10 is adapted to receive the hole 1ᵃ of mold member 1 to retain the latter concentrically on the stem. Said projection 11 may be passed through the hole in disk 4ᵃ concentrically with hole 1ᵃ of member 1 to retain the material 4 concentrically on said member. When the parts are assembled as in Fig. 8 the ring 2 will be placed upon the disk of material 4 in position to be pushed toward mold member 1 to fold the material 4 therearound, as before explained. The abutment or plate 5 opposes ring 2 on the side away from disk 4 and is shown carried by plunger or piston 12 operative in cylinder 13 secured upon the cross head 14 shown attached by rods 15 to base 8. Said abutment or plate 5 is shown provided with hole 5ᵃ adapted to receive the opposing end of projection or pin 11. The plunger or piston 12 is shown provided with a rod 16 guided through stuffing box 17 on cross head 14. A spring 18 coiled around said rod opposes at one end a stop 19 on the cross head and at the other end opposes stop 20 on rod 16, whereby said spring normally tends to draw the plunger or piston 12 into cylinder 13 thereby to raise the abutment or plate 5. The plunger or piston 9 is shown provided with packing in cylinder 7, the latter having an inlet at 22 whereby fluid such as water, or oil, may be forced under pressure into the cylinder to push the plunger. The weight of the piston or plunger is such as to displace said fluid when the valve controlling the same is opened to permit the descent of the plunger. Plunger or piston 12 is provided with packing 23 and cylinder 13 has an inlet 24 for said fluid whereby the latter under pressure may force the plunger with abutment 5 downwardly, the valve controlling the fluid being opened during escape of the fluid from cylinder 13, the spring 18 exerting its pressure to raise the plunger 12 to lift the abutment 5 and cause discharge of the fluid from the cylinder. The means for providing hydraulic pressure and valves for controlling the flow to and from the cylinders 7 and 13 may be of any well known or suitable construction used for hydraulic pressure work.

The upper surface of the head or table 9ᵃ may be provided with concentric lines as a guide for placing mold ring 3 in proper position to coöperate with mold ring 2. When the U-packing is to be formed the desired ring 3 is placed upon head or table 9ᵃ, mold member 1 is located upon stem 10, disk 4 is placed upon member 1, and ring 2 is placed upon disk 4, the plungers being separated, as illustrated in Fig. 8. Fluid pressure is first admitted to cylinder 13 to force plunger 12 and abutment 5 down upon ring 2 to cause said ring to fold the disk of material 4 around member 1 in the manner previously described, substantially as shown in Fig. 9, providing the skirt portion 4ᵇ protruding from ring 2. Pressure is maintained in cylinder 13 to resist the next operation and fluid pressure is admitted to cylinder 7 to force plunger 9 with ring 3 upwardly so that said ring will be pushed against the skirt portion 4ᵇ of material 4 to fold the latter around ring 2, as illustrated in Figs. 8 and 10. After the material 4 has been folded as stated the fluid pressure in the cylinders will be released, the plungers will move back, and the mold parts with the folded material may be removed from the apparatus. The operations will be repeated for each U-packing.

In case the material 4, such as leather, shall have been soaked in water, oil or other liquid, it is preferable to allow the material to dry with the mold parts assembled thereon, as in Figs. 3 and 10. When the mold parts have been removed from the folded material the central portion 4ª will be cut away producing a U-shaped ring, and the edges of the walls of said ring will be trimmed to suit requirements, resulting in the completed U-packing in ring-like form as shown in Fig. 6.

The material is not merely stretched to fold it over the edge of mold member 1, nor to fold it over the edge 2ª of ring 2, since in both instances the extended portion of the material is free, and at the folded part 4ᵈ the material is folded over the edge 2ª of ring 2 without being crowded or stretched whereby in the finished product the packing may be thicker at 4ᵈ than along the side walls in case slight stretching of such walls may have occurred. An advantage of my invention is that the leather required for making the packing need be of no greater thickness than that called for in the finished product. The parts of the packing exposed to wear having been compressed and hardened in forming the packing results in increased life and utility thereof since the material is not cracked nor torn while being folded and danger of leakage past the packing in use is lessened.

With the three-part mold described, any desired inside diameter of one part may be used with any outside diameter of another part, and the inner ring 2 is the only one requiring change for producing two different packings having the same inside diameter and different outside diameter or different thickness of leather or other material. The parts of the mold may be made of any desired material, such as brass, cast or wrought iron or steel, or any desired combination of the same, or one or more of the parts may be made of suitable wood.

Having thus described my invention, what I claim and desire to secure by Letters Patent is:—

1. A mold for forming U-packing comprising an inner member and two separate concentric rings of different diameter to fit one within another with a space therebetween, both rings being of greater diameter than said member to receive folded material respectively between the member and inner ring and between the two rings, an abutment adapted to oppose said member and the inner ring, and means to detachably apply said abutment to said member with the material therebetween.

2. A mold for forming U-packing comprising an inner member and two separate concentric rings of different diameter to fit one within another with a space therebetween, both rings being of greater diameter than said member to receive folded material respectively between the member and the inner ring and between the two rings, an abutment to oppose said member, said member and abutment having coinciding holes, and a projection operative in said holes to retain said plate and said member with the material therebetween.

3. The combination of an inner member, two separate concentric rings of different diameter to fit one within another around said member with spaces respectively therebetween, an abutment for said member, a movable rest for one of the rings, a movable abutment spaced from the last named abutment to operate the other ring, and means to move said rest and abutment toward one another to cause said rings and member to fold a piece of material therebetween.

4. The combination of an inner member, two separate concentric rings of different diameter to fit one within another around said member with spaces respectively therebetween, a support for said member, a plunger concentric with the support, said plunger being adapted to support one of said rings, a plunger spaced from said support to actuate the other ring, said plungers being arranged to move said rings relatively to said member to fold a piece of material between said member and rings.

5. The combination of an inner member, two separate concentric rings of different diameter to fit one within another around said member with spaces respectively therebetween, a cylinder, a plunger slidable therein and having a bore, a stem supported concentrically within the cylinder and bore adapted to support said member, a second cylinder spaced from the first named cylinder, and a plunger in the second named cylinder provided with an abutment portion whereby said plungers may move said rings around said member to fold material in U-form therebetween.

6. The combination of an inner member, two separate concentric rings of different diameter to fit one within another around said member with spaces respectively therebetween, a cylinder, a plunger slidable therein and having a bore, a stem supported concentrically within the cylinder and bore adapted to support said member, a second cylinder spaced from the the first named cylinder, a plunger in the second named cylinder provided with an abutment portion whereby said plungers may move said rings around said member to fold material in U-form therebetween, and a spring connected with the second named plunger to retract it.

7. The combination of an inner member, two separate concentric rings of different diameter to fit one within another around said member with spaces respectively therebetween, a cylinder, a plunger slidable therein and having a bore, a stem supported concentrically within the cylinder and bore adapted to support said member, a second cylinder spaced from the first named cylinder, a plunger in the second named cylinder provided with an abutment portion whereby said plungers may move said rings around said member to fold material in U-form therebetween, said stem having a projection at its end to receive a hole in said member to retain the latter concentrically on the stem.

Signed at New York in the county of Kings and State of New York this 7th day of February, A. D. 1920.

THOMAS CROSSETT.